United States Patent Office 2,953,595
Patented Sept. 20, 1960

2,953,595
SECONDARY PHOSPHINIC ACIDS

Michael M. Rauhut, Stamford, and Helen A. Currier, Greenwich, Conn., assignors to American Cyanamid Company, New York, N.Y., a corporation of Maine No Drawing. Filed Oct. 20, 1958, Ser. No. 768,018

10 Claims. (Cl. 260—465.5)

The present invention relates to new and useful organophosphorus compounds and to the preparation thereof. More particularly, the instant invention concerns secondary phosphinic acids having at least one 2-thiocarbamylethyl group directly attached to the P atom and corresponding to the formula

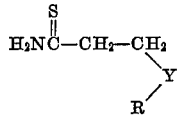

wherein Y represents a member selected from the group consisting of

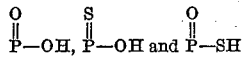

and R represents

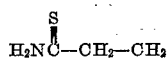

$CN-CH_2-CH_2$; a saturated and unsaturated, substituted and unsubstituted alicyclic radical, including cyclohexyl, cyclopentyl, and the like; a substituted and unsubstituted, saturated and unsaturated, branched and straight chain alkyl radical having up to 10 carbon atoms in the chain; and a substituted and unsubstituted aryl radical.

Included among the substituents contemplated herein for the alicyclic, alkyl and aryl radicals are halogen, cyano, amino, hydroxyl, carbamyl, acyloxy, carbalkoxy, carboxy, alkyloxy, aryl, aryloxy, and like substituents.

According to the present invention a secondary phosphine or phosphine oxide corresponding to the formula

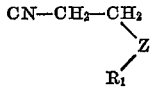

is brought into contact with sulfur and water to produce the corresponding 2-thiocarbamylethyl substituted phosphinic acid having the structural formula

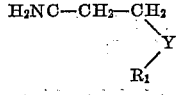

In the formula

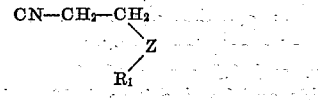

Z represents PH and

and $R_1$ represents

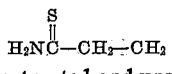

$CN-CH_2-CH_2$; a saturated and unsaturated, substituted and unsubstituted alicyclic radical, including cyclohexyl, cyclopentyl, and the like; a substituted and unsubstituted, saturated and unsaturated, branched and straight chain alkyl radical having up to 10 carbon atoms in the chain; and a substituted and unsubstituted aryl radical.

If desired, reaction is made to take place in the presence of a solvent, such as aqueous ammonium hydroxide, isopropyl alcohol, polar solvents, such as acetonitrile, and the like. In order to facilitate precipitation of the resulting product solids, the reaction mixture may be made slightly acidic by the addition of a mineral acid, such as HCl, HBr, $H_2SO_4$, or the like.

The novel products of the present invention are useful as flame-retardants. For example, bis(2-thiocarbamylethyl)phosphinic acid may be used to treat cotton in order to enhance its flame-retarding properties. In this regard, for example, cotton percale is treated with a 24 percent solution of bis(2-thiocarbamylethyl)phosphinic acid prepared by dissolving 3 grams of the acid in 12.5 cubic centimeters of water containing ammonium hydroxide. The thus-treated cotton fabric is dried in an oven for two minutes at about 107° C. with the result that 20 percent of the acid remains deposited on the fabric.

Comparative data show that cotton fabric so processed is a better flame-retardant than the same fabric in its untreated state.

In general, the reactions of the instant discovery are carried out at temperatures in the range of 0° C. to 100° C., preferably 20° C. to 90° C.

A typical reaction in which a secondary phosphine of the type contemplated herein containing at least one 2-cyanoethyl substituent directly attached to the phosphorus atom is reacted with sulfur and water to produce the corresponding phosphinic acid may be illustrated as follows:

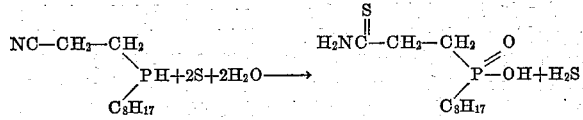

The present invention will best be understood, however, by reference to the following illustrative examples:

EXAMPLE I

Bis(2-thiocarbamylethyl)phosphinic acid $$(NCCH_2CH_2)_2PH+2S+2H_2O \xrightarrow{NH_4OH} (H_2N\overset{S}{\overset{\|}{C}}CH_2CH_2)_2PO_2H$$

A mixture of 5.0 grams (0.036 mole) of bis(2-cyanoethyl)phosphine, 2.5 grams (0.78 mole) of sulfur, 10 milliliters of concentrated ammonium hydroxide solution (specific gravity 0.90) and 10 milliliters of water is heated on a steam bath in a nitrogen atmosphere for one hour, the temperature of the mixture being maintained between 83° C. and 88° C. The resulting reaction mixture is then cooled to room temperature (21° C.–23° C.), freed from excess sulfur by filtration, and acidified with an HCl solution having a specific gravity of 1.19. The thus-acidified solution, after standing three hours at 0° C., deposits 6.2 grams (73 percent of theoretical) of product bis(2-thiocarbamylethyl)phosphinic acid having a melting point of 178° C.–179° C., an acid which is insoluble when heated in benzene, methanol, acetone, ethyl acetate, and dimethyl-formamide, but can be recrystallized from hot water or glacial acetic acid to give white plates melting at 179° C. Furthermore, the product is soluble in dilute alkali (NaOH) and appreciably soluble in 10 percent hydrochloric acid. Analysis. Calculated for $C_6H_{13}N_2O_2PS_2$: C, 29.99; H, 5.45; N, 11.66; P, 12.89. Found: C, 30.03; H, 5.57; N, 11.40; P, 12.76.

EXAMPLE II

*2-cyanoethyl-2-thiocarbamylethylphosphinic acid*

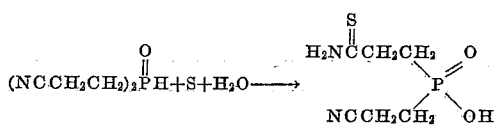

A mixture of 10.0 grams of bis(2-cyanoethyl)phosphine oxide, 2.0 grams of sulfur and 30 milliliters of isopropyl alcohol containing about 5 percent H₂O by weight is refluxed in a nitrogen atmosphere for 1½ hours. Six grams of white crystalline solid (50 percent by weight of theoretical) separates upon cooling the resulting reaction mixture to 21° C.–23° C. Recrystallization from an acetone-isopropyl alcohol solution gives the pure product, 2-cyanoethyl-2-thiocarbamylethylphosphinic acid, having a melting point of 142° C. Analysis. Calculated for $C_6H_{11}N_2O_2PS$: C, 34.94; H, 5.38; N, 13.58; P, 15.02. Found: C, 35.09; H, 5.52; N, 13.93; P, 15.31.

The bis(2-cyanoethyl)phosphine oxide reactant is prepared as in copending U.S. application, Serial No. 752,167, filed July 31, 1958, by exposing bis(2-cyanoethyl)phosphine to air for about two hours at a temperature of about 25° C. A crystalline solid is formed which is recrystallized from acetone to give bis(2-cyanoethyl)phosphine oxide having a melting point of 96° C.–98° C.

EXAMPLE III

*Cyclohexyl-2-thiocarbamylethylthiophosphinic acid*

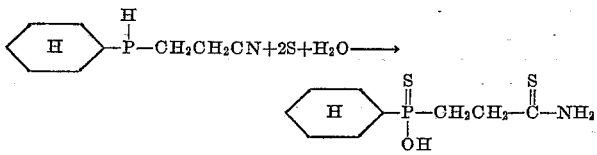

Cyclohexyl-2-cyanoethylphosphine (5.1 grams, 0.03 mole) is added gradually while stirring and in a nitrogen atmosphere to a mixture of 2.5 grams (0.078 mole) of sulfur in 30 milliliters of an aqueous NH₄OH solution (specific gravity 0.90) and 50 milliliters of water. The reactants are at room temperature (21° C.–23° C.) prior to mixing but heat up to about 40° C. upon being admixed, most of the sulfur being thus dissolved. The reaction mixture is then stirred for two hours, the excess sulfur filtered off and the resulting filtrate acidified with dilute HCl. After cooling the acidified mixture overnight at −10° C., white crystalline thiophosphinic acid separates out. Two recrystallizations of this white crystalline material from a benzene-methanol mixture provide 5.7 grams (75 percent by weight of theoretical) of cyclohexyl-2-thiocarbamylethylthiophosphinic acid having a melting point of 115° C.–116° C. Analysis. Calculated for $C_9H_{18}NOPS_2$: C, 43.01; H, 7.22; P, 12.32. Found: C, 43.22; H, 7.12; P, 12.23.

Of course, it will be recognized that compounds having the structure

are generally in tautomeric equilibrium with compounds having the structure

Furthermore, the

derivative of these tautomeric compounds may be realized by heating the reactant mixture above about 60° C., thus hydrolyzing the product. For example, the cyclohexyl-2-cyanoethylphosphine and sulfur reaction mixture of the instant example is heated to about 90° C. while stirring for four hours, as indicated above, and cyclohexyl-2-thiocarbamylethylphosphinic acid is produced instead of the corresponding cyclohexyl-2-thiocarbamylethylthiophosphinic acid identified above.

The 2-cyanoethylcyclohexylphosphine used in this example is prepared by forming a mixture of 8.7 grams (0.10 mole) of 2-cyanoethylphosphine, 16.4 grams (0.20 mole) of cyclohexane, and 0.75 gram (0.005 mole) of α,α′-azobisisobutyronitrile initiator and heating the mixture at 80° C.–85° C. in a nitrogen atmosphere for 2 hours. An additional 0.75 gram of the initiator is added and heating continued for 2 more hours. The resulting reaction mixture is distilled to give 12.3 grams (74 percent of theoretical) of product 2-cyanoethylcyclohexylphosphine having a boiling point of 113° C.–117° C. at 0.3 millimeter pressure.

A sample of 2-cyanoethylcyclohexylphosphine thus produced is redistilled to provide a product having a boiling point of 97° C. (0.3 millimeter pressure) and a refractive index $N_D^{25}$ 1.5088. Analysis. Calculated for $C_9H_{16}NP$: C, 63.88; H, 9.53; P, 18.31. Found: C, 64.17; H, 9.79; P, 18.39.

EXAMPLE IV

*n-Octyl-2-thiocarbamylethylphosphinic acid*

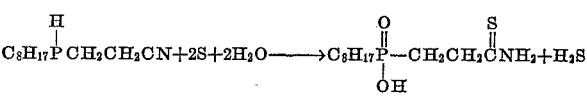

n-Octyl-2-cyanoethylphosphine (2.0 grams, 0.01 mole) and sulfur (1.0 gram, 0.03 mole) are combined with 5 milliliters of an aqueous NH₄OH solution (specific gravity 0.90) and 5 milliliters of H₂O. The resulting reaction mixture, which reaches a temperature of about 42° C. upon first admixing the reactants, is then heated on a steam bath at 90° C. and in an atmosphere of nitrogen for fifteen minutes with stirring. The excess sulfur is filtered off and the resulting filtrate acidified with dilute HCl. A while oil separates out which, after cooling in a refrigerator at about 5° C. overnight, is vigorously shaken to induce crystallization. The resulting solid crystals change to an oil upon exposure to moist air or water, the oil being then dissolved in an aqueous caustic solution containing 10 percent NaOH by weight. This solution mixture is next acidified with an excess of an aqueous solution containing 5 percent HCl by weight. Crystals are obtained by cooling and shaking the thus-acidified mixture, these crystals being filtered rapidly and dried in a vacuum desiccator overnight. Recrystallization from acetonitrile, followed by recrystallization from a mixture of acetonitrile and isopropanol provides 1.1 grams (40 percent by weight of theoretical) of the product having a melting point of 149° C.–152° C. A portion is recrystallized once more from a mixture of acetonitrile and isopropanol to provide an analytical sample having a melting point of 152° C.–152.5° C. The infrared spectrum indicates that the product is n-octyl-2-thiocarbamylethylphosphinic acid. Analysis. Calculated for $C_{11}H_{24}NO_2PS$: C, 49.79; H, 9.09; N, 5.28; P, 11.68; S, 12.08. Found: C, 49.87; H, 9.15; N, 5.06; P, 11.96; S, 11.96.

The n-octyl-2-cyanoethylphosphine used in this example is prepared by forming a mixture of 17.4 grams (0.2 mole) of 2-cyanoethyl phosphine, 23.5 grams (0.20 mole) of a solution containing 95 percent by weight 1-octene, and 1.5 grams (0.01 mole) of ditertiarybutylperoxide and heating it to 115° C. in an atmosphere of nitrogen. The oil bath used to heat the mixture is then removed and the temperature of the mixture rises to about 127° C., at which temperature it is maintained for about 5 minutes (125° C.–127° C.) by intermittent cooling. After 5 minutes the exotherm subsides and the resulting reaction mixture is then maintained at 125° C.–127° C. for 30 minutes by the addition of heat. Distillation of the reaction mixture at the end of the 30-minute period gives 15.5 grams (39 percent of theoretical) of 2-cyanoethyloctylphosphine having a boiling point of 118° C. at 0.45 millimeter pressure and a refractive index of $n_D^{25}$ 1.4745. Analysis. Calculated for $C_{11}H_{22}PN$: C, 66.29; H, 11.13; P, 15.55. Found: C, 66.19; H, 11.17; P, 15.69.

EXAMPLE V

*2-thiocarbamylethylphenylthiophosphinic acid*

Twelve grams (0.23 mole) of acrylonitrile is added dropwise during a 15 minute period to a rapidly stirred mixture of 25.0 grams (0.23 mole) of phenylphosphine, 25 milliliters of acetonitrile, and 5.0 milliliters of 10 Normal aqueous potassium hydroxide solution in an atmosphere of nitrogen. A vigorous exotherm occurs and the temperature is maintained between 25° C. and 30° C. by cooling in an ice bath. After the addition of the acrylonitrile a resulting organic layer is separated, washed with a saturated sodium chloride solution, dried with anhydrous sodium sulfate, and distilled to obtain 2-cyanoethylphenylphosphine.

One-tenth mole of 2-cyanoethylphenylphosphine is added to a suspension of 0.2 mole of sulfur in a mixture of 50 milliliters of concentrated ammonium hydroxide solution (specific gravity 0.90) and 50 milliliters of water at room temperature (21° C.-23° C.). The reaction mixture is then stirred for 2 hours, the excess sulfur filtered off and the resulting filtrate acidified with dilute HCl. After cooling the acidified mixture overnight at —10° C., white crystalline 2-thiocarbamylethylphenylthiophosphinic acid separates out and is recovered.

Preferably, the reactants employed herein are present in at least stoichiometric quantities. For example, 2 moles of sulfur and 2 moles of water will react with one mole of bis(2-cyanoethyl)phosphine to yield 1 mole of bis(2-thiocarbamylethyl)phosphinic acid. Consequently, excesses of any one reactant or slightly less than stoichiometric quantities thereof may be used without affecting the nature of the reaction.

While the present invention has been described in detail with respect to specific embodiments thereof, it is not intended that these details unduly restrict the scope of the invention, since it is obvious that numerous modifications within the skill of the art are contemplated herein.

We claim:

1. A compound represented by the formula

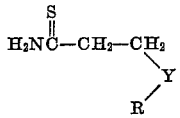

wherein Y represents a member selected from the group consisting of

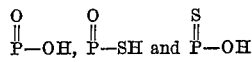

and R represents

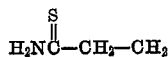

$CN-CH_2-CH_2$; an unsubstituted, saturated alkyl radical having up to 10 carbon atoms in the chain; a cyclcohexyl radical, a cyclopentyl radical; and a phenyl radical.

2. 2-cyanoethyl-2-thiocarbamylethylphosphinic acid.
3. Bis(2-thiocarbamylethyl)phosphinic acid.
4. Cyclohexyl-2-thiocarbamylethylthiophosphinic acid.
5. n-Octyl-2-thiocarbamylethylphosphinic acid.
6. A method which comprises bringing a compound corresponding to the formula

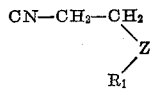

wherein Z is a member selected from the group consisting of PH and

and $R_1$ represents

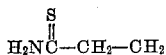

$CN-CH_2-CH_2$; an unsubstituted, saturated alkyl radical having up to 10 carbon atoms in the chain; a cyclohexyl radical; a cyclopentyl radical; and a phenyl radical, into contact with sulfur and water at a temperature between 0° C. and 100° C. to produce the corresponding product which conforms to the formula

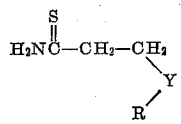

wherein Y represents a member selected from the group consisting of

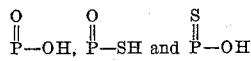

and R represents

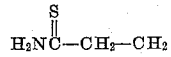

$CN-CH_2-CH_2$; an unsubstituted, saturated alkyl radical having up to 10 carbon atoms in the chain; a cyclohexyl radical; a cyclopentyl radical; and a phenyl radical.

7. The process of claim 6 wherein the secondary phosphine is bis(2-cyanoethyl)phosphine and the product recovered is bis(2-thiocarbamylethyl)phosphinic acid.

8. The process of claim 6 wherein the secondary phosphine is cyclohexyl-2-cyanoethylphosphine, the reaction temperature is below 60° C., and the product recovered is cyclohexyl-2-thiocarbamylethylthiophosphinic acid.

9. The process of claim 6 wherein the secondary phosphine is n-octyl-2-cyanoethylphosphine and the product recovered is n-octyl-2-thiocarbomylethylphosphinic acid.

10. The process of claim 6 wherein the secondary phosphine oxide is bis(2-cyanoethyl)phosphine oxide and the product recovered is 2-cyanoethyl-2-thiocarbamylethylphosphinic acid.

No references cited.

UNITED STATES PATENT OFFICE
CERTIFICATION OF CORRECTION

Patent No. 2,953,595                                    September 20, 1960

Michael M. Rauhut et al.

It is hereby certified that error appears in the above numbered patent requiring correction and that the said Letters Patent should read as corrected below.

Column 1, lines 55 to 58, the formula should appear as shown below instead of as in the patent:

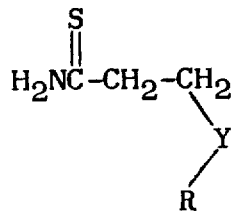

column 6, line 55, for "n-octyl-2-thiocarbomylethylphosphinic acid" read -- n-octyl-2-thiocarbamylethylphosphinic acid --.

Signed and sealed this 9th day of May 1961.

(SEAL)
Attest:

ERNEST W. SWIDER                                  DAVID L. LADD
Attesting Officer                              Commissioner of Patents